UNITED STATES PATENT OFFICE.

SIDNEY WHITFIELD BRAY, OF ILFORD, AND IAN HUTTON BALFOUR, OF BUCKHURST HILL, ENGLAND, ASSIGNORS TO THE BRITISH OXYGEN COMPANY, LIMITED, OF WESTMINSTER, LONDON, ENGLAND.

MANUFACTURE OR PRODUCTION OF HYDROGEN.

1,360,876.          Specification of Letters Patent.      Patented Nov. 30, 1920.

No Drawing.      Application filed March 31, 1920. Serial No. 370,267.

*To all whom it may concern:*

Be it known that we, SIDNEY WHITFIELD BRAY, residing at 11ª Melbourne Road, Ilford, Essex, England, and IAN HUTTON BALFOUR, residing at "Elsemere," Buckhurst Hill, Essex, England, both subjects of the King of Great Britain, have invented new and useful Improvements in or Connected with the Manufacture or Production of Hydrogen, of which the following is a specification.

In hydrogen plants which make use of the action of steam on metallic iron with the production of iron oxids and hydrogen, the iron oxid which is formed has to be periodically reduced to metallic iron by water gas, or other suitable gas, or gases. During the reduction of the iron oxid, some of the carbon monoxid and hydrogen of the reducing gas, or gases, is oxidized and carbon dioxid and steam, or water vapor, are produced but as these react with metallic iron at the retort temperatures, the reaction, so far as they are concerned, is a reversible one and may be expressed by the equations:—

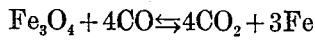

and

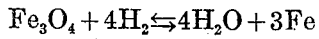

Therefore, the so-called spent gases leaving the retort, or bench, (which we will refer to as a unit), although no longer reducing gases, always contain a proportion of unused hydrogen and carbon monoxid, the amounts of which are determined, providing equilibrium has been attained, by the temperature and other conditions in the unit and it is the object of this invention to utilize such spent gases in a commercially available manner without the necessity for any gasometer for their storage, or other expensive apparatus over and above that hitherto, or normally, required.

According to this invention we pass the whole of the so-called spent gases from the unit in which their reductive action has been fully utilized in reducing the charge therein and, after removing from them the steam, and as much water-vapor as can be economically done, together with carbon dioxid and sulfur compounds (which can be effected by any known, or suitable means of condensation, absorption, or purification) we pass the said gases directly into a second unit in which the charge has become oxidized and we utilize the said treated gases in the reduction of the said oxidized charge, for instance by using two units in communication with each other so that while the first unit receives only fresh water-gas, for reduction purposes, the other unit receives, for reduction purposes, only the spent gases from the first unit, after such gases have been treated as hereinbefore explained. The final waste gases from the second unit may be discharged into the furnace setting or into the atmosphere. Or we may perform the invention using three units as follows:—While a unit which, for the time being is the first of the series, is being employed in the production of hydrogen the unit which, for the time being is the second of the series is receiving water-gas to completely reduce the iron oxid formed when hydrogen was being made in this second unit, and the unit which, for the time being is third in the series in receiving the whole of the spent gases from the unit second in the series, which spent gases before they enter the third unit have been treated as hereinbefore explained.

When the iron in the first unit has become oxidized the order of the units is changed, that which was third (and has had its charge partially reduced by the treated waste gases) becoming second (to have the reduction of its charge completed by fresh water-gas) that which was second becoming first (for the production of hydrogen therein) and that which was first becoming third (for receiving the treated waste gases) and so on at intervals of time when the iron in the unit for the time being first in the series has become oxidized and requires to be reduced, the spent gases, after the aforesaid treatment, being passed alone to the unit then third in the series, and utilized therein for the purpose of reduction.

The aforesaid treatment of the waste gases before they are passed to the unit in which they are used for effecting reduction may be carried out for example as follows:—The said gases are passed through a scrubber charged with pieces of marble, coke, or other suitable material, over which water is passed and by this means sulfur compounds are removed from the gases. The said gases are then passed through water, or a solution of potash, or the like, for the removal of carbon dioxid. The gases are then passed through a tubular, or other suitable, condenser and, by the slow cooling which takes place therein, the steam is condensed and the water-vapor, present in the gases is, as far as practically possible, removed.

In place of the spent gases, after passing through the scrubber, being passed through water, or a solution of potash, or the like, they can be next passed through the tubular condenser, and afterward be passed through a purifier charged with lime for the removal of the carbon dioxid. By either of the aforesaid combined operations the spent gases which have ceased to be reducing gases are deprived of sulfur compounds and carbon dioxid and all steam and as much as practically possible of the water-vapor are removed.

We are aware that it has before been proposed to reuse the reducing medium which has been only partially consumed by passing it through a condenser and purifiers and afterward again through the same retort and we make no general claim to such process.

What we claim is:—

In, or in connection with, the manufacture, or production, of hydrogen as aforesaid; passing the whole of the gases which have effected reduction in a unit, and which have become non-reducing therein, from that unit, through means for removing from them the steam and some water-vapor, and also carbon-dioxid, and sulfur compounds; and then passing the said gases so treated into another unit containing an unreduced charge in which unit they are employed as the means of effecting reduction of the charge therein.

In testimony whereof we have signed our names to this specification in the presence of two subscribing witnesses.

SIDNEY WHITFIELD BRAY.
IAN HUTTON BALFOUR.

Witnesses:
  DAISY M. PHILLIPS.
  BERTHA L. A. MIDDLETON.